United States Patent
Fujimori (10) Patent No.: US 7,564,610 B2
(45) Date of Patent: Jul. 21, 2009

(54) LIGHT CONTROL DEVICE AND LIGHT CONTROL SYSTEM USING SAME

(75) Inventor: Yoshikazu Fujimori, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 537 days.

(21) Appl. No.: 11/468,869

(22) Filed: Aug. 31, 2006

(65) Prior Publication Data

US 2007/0046605 A1   Mar. 1, 2007

(30) Foreign Application Priority Data

Sep. 1, 2005   (JP) ............... 2005-253299

(51) Int. Cl.
  *G02F 1/03* (2006.01)
  *G02F 1/00* (2006.01)
  *G02F 1/01* (2006.01)
(52) U.S. Cl. ............... 359/245; 359/254; 359/321; 359/279; 349/82; 349/139; 345/90
(58) Field of Classification Search ............... 359/321, 359/279, 254, 245, 315, 316, 319, 558, 559, 359/563, 566, 569, 573; 349/82, 139, 141, 349/143, 147; 345/76, 87, 90; 348/302, 348/382, 728, 759, 764, 765, 774, 800, 805, 348/815
See application file for complete search history.

(56) References Cited

U.S. PATENT DOCUMENTS

| | | | | |
|---|---|---|---|---|
| 3,813,142 | A * | 5/1974 | Buhrer ................ | 385/10 |
| 4,448,490 | A * | 5/1984 | Shibuya et al. ........ | 349/82 |
| 4,566,031 | A * | 1/1986 | Kirk ................... | 348/40 |
| 4,750,815 | A * | 6/1988 | Kataoka et al. ....... | 359/279 |
| 5,093,747 | A * | 3/1992 | Dorschner ............ | 359/316 |
| 5,212,583 | A * | 5/1993 | Vali et al. ............ | 359/245 |
| 5,943,159 | A * | 8/1999 | Zhu ................... | 359/316 |
| 6,327,013 | B1 * | 12/2001 | Tombling et al. ...... | 349/139 |
| 6,456,419 | B1 * | 9/2002 | Winker et al. ......... | 359/279 |

FOREIGN PATENT DOCUMENTS

JP   07-146657 A   6/1995

* cited by examiner

*Primary Examiner*—Loha Ben
(74) *Attorney, Agent, or Firm*—Keating & Bennett, LLP

(57) ABSTRACT

A light control device has a substrate, a planar electrode, a light modulating film having a refractive index that is changeable in accordance with an electric field applied to the film, and a plurality of electrode segments arranged at a predetermined interval on the light modulating film. A controller applies a control voltage to at least predetermined electrode segments, and the remaining electrode segments and the planar electrode are set to ground potential. This makes the interval of a distribution of electric fields generated in the light modulating film larger than the interval of the electrode segments.

15 Claims, 7 Drawing Sheets

LIGHT CONTROL DEVICE AND LIGHT CONTROL SYSTEM USING SAME

BACKGROUND OF THE INVENTION

1. Field of the Invention

The present invention relates to a light control device using an electro-optic material, which changes its refractive index upon application of an electric field, and also relates to a light control system including such a light control device.

2. Description of the Related Art

In recent years, there have been proposed light control elements that use materials having an electro-optic effect such as lanthanum lead zirconate titanate (hereinafter referred to as PLZT). PLZT is a transparent ceramic having the composition $(Pb_{1-y}La_y)(Zr_{1-x}Ti_x)O_3$. The electro-optic effect refers to such a phenomenon that a substance, upon application of an electric field thereto, is polarized and changes the refractive index. Making use of the electro-optic effect makes it possible to switch the phase of light by turning on and off the applied voltage. This makes light modulating materials having the electro-optic effect applicable to light control elements such as optical shutters.

In applying such materials to light control elements such as optical shutters, bulk PLZT has been widely used. However, with optical shutters using bulk PLZT, it is difficult to meet such requirements as refinement and integration, as well as such requirements as a reduction in operating voltage and cost. Furthermore, the bulk method which produces bulk PLZT includes a step of treatment involving a high temperature of 1,000° C. or higher after mixing a metal oxide used as the original material. Therefore, when this method is used for manufacturing a device, there are many restrictions on the selection of materials and on the device structure.

In view of this, an attempt is being made to replace bulk PLZT and form a thin film PLZT on a substrate and apply this to light control elements. Patent document 1 (Japanese Unexamined Patent Publication No. 7-146657) discloses a display device having a PLZT film formed on a transparent substrate such as glass, and comb-shaped electrodes formed on the PLZT film. This display device is configured to have polarizing plates provided on both sides of the display substrate on which the PLZT film is provided. The electrode terminal of each pixel is coupled to an external driving circuit to enable the driving of a desired pixel. Then, when light is transmitted from a light source provided on one side of the display substrate, a desired display is achieved.

For light control devices, which carry out on-off control of light, it is important to make the on-off ratio high which is the ratio of light intensity in the "on" state relative to light intensity in the "off" state. For example, for image forming devices such as laser printers, a reduction in the on-off ratio of the light control device can cause degraded image quality.

SUMMARY OF THE INVENTION

In order to overcome the problems described above, preferred embodiments of the present invention provide a light control device having an improved on-off ratio and a light control system including the light control device.

According to a first preferred embodiment of the present invention, a light control device includes a light modulating film having a refractive index that is changeable in accordance with an electric field applied to the film, a plurality of electrode segments arranged at a first predetermined interval on the light modulating film, and a controller for applying a voltage to at least predetermined electrode segments of the plurality of electrode segments, wherein electric fields are distributed at a second predetermined interval in the light modulating film, and the second predetermined interval of the electric fields generated in the light modulating film is larger than the first predetermined interval of the plurality of electrode segments.

In the present preferred embodiment, when there are no electric fields distributed at the second predetermined interval in the light modulating film, the light control device functions as a diffraction grating generated by the plurality of electrode segments arranged at the first predetermined interval. When a voltage is applied to at least predetermined electrode segments of the plurality of electrode segments, and thus electric fields are distributed at the second predetermined interval in the light modulating film, there appear reflective indices distributed at the second predetermined interval in the light modulating film. This results in another diffraction grating formed in response to the refractive indices distributed at the second predetermined interval in the light modulating film, in addition to the diffraction grating generated by the plurality of electrode segments arranged at the first predetermined interval. By setting the interval of distribution of the electric fields generated in the light modulating film to be larger than the interval of the plurality of electrode segments, the grating interval of the diffraction grating generated by the refractive indices distributed at the second predetermined interval in the light modulating film becomes larger than the grating interval of the diffraction grating generated by the plurality of electrode segments arranged at the first predetermined interval. This makes it possible to emit diffracted light caused by the diffraction grating of the refractive indices distributed at the second predetermined interval in the light modulating film, in a direction different from the direction of the diffracted light caused by the diffraction grating of the plurality of electrode segments arranged at the first predetermined interval. When there are no electric fields distributed at the second predetermined interval in the light modulating film, there is substantially no diffraction of light in the direction of the diffracted light caused by the diffraction grating of the refractive indices distributed at the second predetermined interval in the light modulating film. This makes it possible to make the amount of leakage of light in the direction of interest extremely small, thereby improving the on-off ratio.

Another preferred embodiment of the present invention is also directed to a light control device. This light control device includes a light modulating film having a refractive index that is changeable in accordance with an electric field applied to the film; a plurality of first electrode segments arranged at a first predetermined interval on a first surface of the light modulating film; a second electrode arranged on a second surface of the light modulating film opposite the first surface of the light modulating film; and a controller for controlling a voltage applied to at least predetermined electrode segments of the plurality of first electrode segments. When the light control device is in an "on" state, the controller controls the voltage applied to the at least predetermined electrode segments of the plurality of first electrode segments so that there is an alternate arrangement of an electrode segment having a significant electric field and an electrode segment having an insignificant electric field, the significant electric field and the insignificant electric field being determined by a potential difference relative to the second electrode. When the light control device is in an "off" state, the controller controls the voltage applied to the at least predetermined electrode segments of the plurality of first electrode segments so that all of the plurality of first electrode segments have insignificant electric fields determined by a potential difference relative to the second electrode.

An insignificant electric field refers to an electric field of a certain degree that causes no change in the refractive index of the light modulating film, or that causes too small a change in the refractive index to allow the light modulating film to function as a diffraction grating. A significant electric field refers to an electric field of a certain degree that allows the light modulating film to effectively function as a diffraction grating when the significant electric field and an insignificant electric field are applied to the light modulating film alternately, and thus there are refractive indices distributed at a predetermined interval in the light modulating film.

In the present preferred embodiment, when the light control device is in an "off" state, the light control device functions as a diffraction grating generated by the plurality of first electrode segments arranged at the first predetermined interval. When the light control device is in an "on" state, the light control device also functions as another diffraction grating generated by refractive indices distributed at the second predetermined interval in the light modulating film. When the light control device is in an "on" state, the voltage applied to the at least predetermined electrode segments of the plurality of first electrode segments is controlled so that there is an alternate arrangement of an electrode segment having a significant electric field and an electrode segment having an insignificant electric field. This makes the grating interval of the diffraction grating generated by the refractive indices distributed at the second predetermined interval in the light modulating film larger than the grating interval of the diffraction grating generated by the plurality of first electrode segments arranged at the first predetermined interval. This in turn makes it possible to emit diffracted light caused by the diffraction grating of the refractive indices distributed at the second predetermined interval in the light modulating film, in a direction different from the direction of the diffracted light caused by the diffraction grating of the plurality of first electrode segments arranged at the first predetermined interval when the light control device is in an "on" state. When the light control device is in an "off" state, there is approximately no diffraction of light in the direction of the diffracted light caused by the diffraction grating of the refractive indices distributed at the second predetermined interval in the light modulating film. This makes it possible to make the amount of leakage of light in the direction of interest extremely small, thereby improving the on-off ratio.

When the light control device is in an "off" state, the controller may control the voltage applied to the at least predetermined electrode segments of the plurality of first electrode segments so that none of the plurality of first electrode segments have a potential difference relative to the second electrode.

The light control device may have a light reflecting layer located on a side of the second surface of the light modulating film. In this case, a reflective light control device is obtained.

The second electrode may act as a light reflecting layer. In this case, a reflective light control device with a simple structure is obtained.

The light modulating film may be made of an electro-optic material having a refractive index that is changeable in proportion to the square of an electric field applied to the light modulating film. The electro-optic material may be lead zirconate titanate or lanthanum lead zirconate titanate. In this case, a light control device is obtained in a preferred manner.

The light control device may be arranged on a semiconductor substrate. In this case, the control circuit of the light control device can be integrated on the semiconductor substrate, making it possible to miniaturize the light control device and the control circuit thereof.

The light control device may have a light receiver for detecting light from the light modulating film when the light control device is in an "on" state.

Another preferred embodiment of the present invention is directed to a light modulating system. This light modulating system includes the above-described light control device and a light emitter for radiating light to the light control device. In this preferred embodiment, for example, image forming devices and image display devices are obtained.

It will be appreciated that other applications of the present invention wherein the above-recited components are combined in an arbitrary manner and wherein the present invention is practiced as a method (process) or a system are contemplated as valid preferred embodiments of the present invention.

With the preferred embodiments of the present invention, a light control device having an improved on-off ratio and a light control system including such a novel light control device are provided.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Figure 1A:
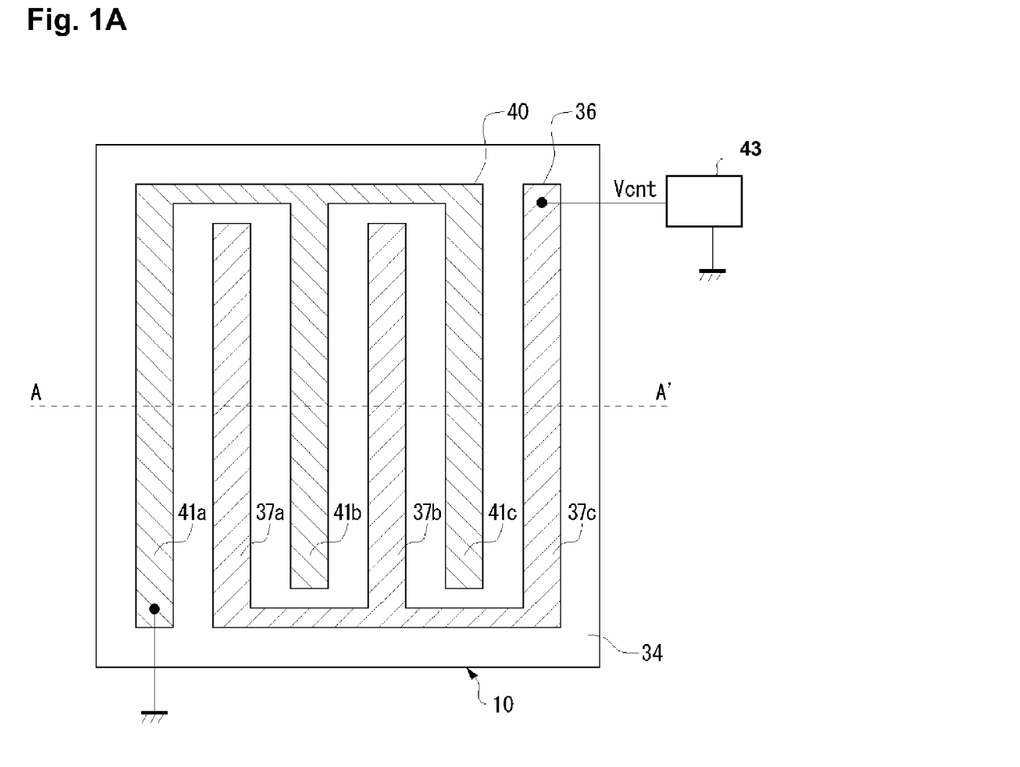
FIG. 1A is a plan view of a light control device according to a preferred embodiment of the present invention.
Figure 1B:
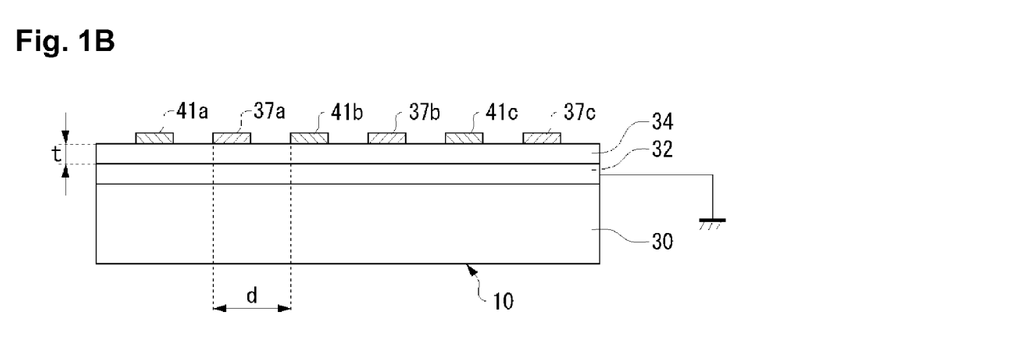
FIG. 1B is a cross sectional view of the light control device in FIG. 1A taken along the line A-A'.

FIG. 1A is a plan view of a light control device according to a first preferred embodiment of the present invention. FIG. 1B is a cross sectional view of the light control device in FIG. 1A taken along the line A-A'. Referring to FIGS. 1A and 1B, a light control device 10 preferably includes a substrate 30, a planar electrode 32, a light modulating film 34, comb-shaped electrodes 36 and 40, and a controller 43. The size of the light control device 10 is approximately 25 μm×25 μm, for example.

The light control device 10 is formed on the substrate 30. As a material for the substrate 30, glass, silicon or other suitable material having a flat surface is preferably used. When the substrate 30 is made of a semiconductor substrate such as silicon, a switching element may be formed on the substrate, with the light control device 10 formed on the switching element. In this case, the light control device 10 and the control circuit thereof can be miniaturized.

On the substrate 30, the planar electrode 32 is provided. As a material for the planar electrode 32, a metal material such as platinum (Pt) is preferably used. The thickness of the planar electrode 32 is approximately 200 nm, for example. In the present preferred embodiment, the planar electrode 32 is made of platinum and thus also functions as a reflecting layer that reflects incident light. Using the planar electrode 32 as a reflecting layer results in a simple structure. When the planar electrode 32 is made of platinum, the reflectivity of the planar electrode 32 is about 50%-80%.

On the upper surface of the planar electrode 32, the light modulating film 34 is provided. As a material for the light modulating film 34, a solid electro-optic material, which has a changeable refractive index in accordance with an electric field applied to the light modulating film 34, is preferably selected. Examples of such an electro-optic material include PLZT (lanthanum lead zirconate titanate), PZT (lead zirconate titanate), $LiNbO_3$, GaAs-MQW, SBN ((Sr, Ba)$Nb_2O_6$), and other suitable similar materials. PLZT is particularly preferred.

The thickness t of the light modulating film 34 is determined in accordance with the incident angle and the wavelength λ of incident laser light. For example, when a red laser with a wavelength λ of approximately 650 nm is used, the thickness t is preferably within the range of about 500 nm to about 1,500 nm. As described later, an electric field applied to the light modulating film 34 extends in the thickness direction of the light modulating film 34. Setting the thickness to be about 1,500 nm or less makes it possible to apply an electric field to obtain a sufficient change in the refractive index. Setting the thickness to be about 500 nm or more makes it possible to allow the light modulating film 34 to function effectively as a diffraction grating when electric fields are applied at a predetermined interval.

On the upper surface of the light modulating film 34, comb-shaped electrodes 36 and 40 are provided. The comb-shaped electrode 36 has, as the teeth of the comb, three electrode segments 37a, 37b, and 37c. The electric potentials of the electrode segments are kept the same. The comb-shaped electrode 40 has, as the teeth of the comb, three electrode segments 41a, 41b, and 41c. The electric potentials of the electrode segments are kept the same. The width of the electrode segments 37a, 37b, 37c, 41a, 41b, 41c are preferably the same. The electrode segments 37a, 37b, and 37c of the comb-shaped electrode 36 and the electrode segments 41a, 41b, and 41c of the comb-shaped electrode 40 are arranged alternately at a first predetermined interval. That is, as shown in FIG. 1A at the line A-A', the six electrode segments are arranged on the light modulating film 34 at the first predetermined interval d in the order 41a, 37a, 41b, 37b, 41c, and 37c. The electrode segments 41a, 37a, 41b, 37b, 41c, and 37c arranged at the first predetermined interval each define an electrode pair with the planar electrode 32.

The interval d of the electrode segments is determined in accordance with the wavelength λ of incident laser light, and is preferably about 1.5 to about 4 times the wavelength λ. For example, when a red laser with a wavelength λ of 650 nm is used, the interval d of the electrode segments is preferably about 0.975 μm to about 2.6 μm. The width of each of the electrode segments is approximately half the interval d of the electrode segments. For example, when the interval d of the electrode segments is approximately 2 μm, the width of each of the electrode segments is approximately 1 μm. The length of each of the electrode segments is preferably at least about five times the width thereof, for example.

The comb-shaped electrodes 36 and 40 are preferably made transparent by using, for example, ITO (Indium Tin Oxide), ZnO, and $IrO_2$. Making the comb-shaped electrodes 36 and 40 transparent enhances the light use efficiency. When the comb-shaped electrodes 36 and 40 are formed of ITO or ZnO, the thickness is preferably about 100 nm to about 150 nm. When the comb-shaped electrodes 36 and 40 are formed of $IrO_2$, the thickness is preferably thinner, e.g., about 50 nm. Furthermore, when the comb-shaped electrodes 36 and 40 are transparent, there is a trade-off relationship between the resistance value and the transmittance; therefore the thickness maybe determined experimentally. The comb-shaped electrodes 36 and 40 may be made as follows. After accumulating ITO by sputtering, the comb-shaped electrodes 36 and 40 are printed onto the ITO by photolithography and followed by etching.

The controller 43 applies a control voltage Vcnt to the comb-shaped electrode 36. The control voltage Vcnt is applied to the electrode segments 37a, 37b, and 37c, which are predetermined electrode segments of the six electrode segments arranged on the light modulating film 34. Control voltage Vcnt is a signal taking two values, a high level VH and a low level VL. The high level VH is about 15 V to about 20 V, and the low level VL is the same as a ground potential. The potential of the comb-shaped electrode 40, on the other hand, is fixed to the ground potential. The potentials of the electrode segments 41a, 41b, and 41c are fixed to the ground potential. Also, the potential of the planar electrode 32 is fixed to the ground potential, as shown in FIG. 1B.

Figure 2:
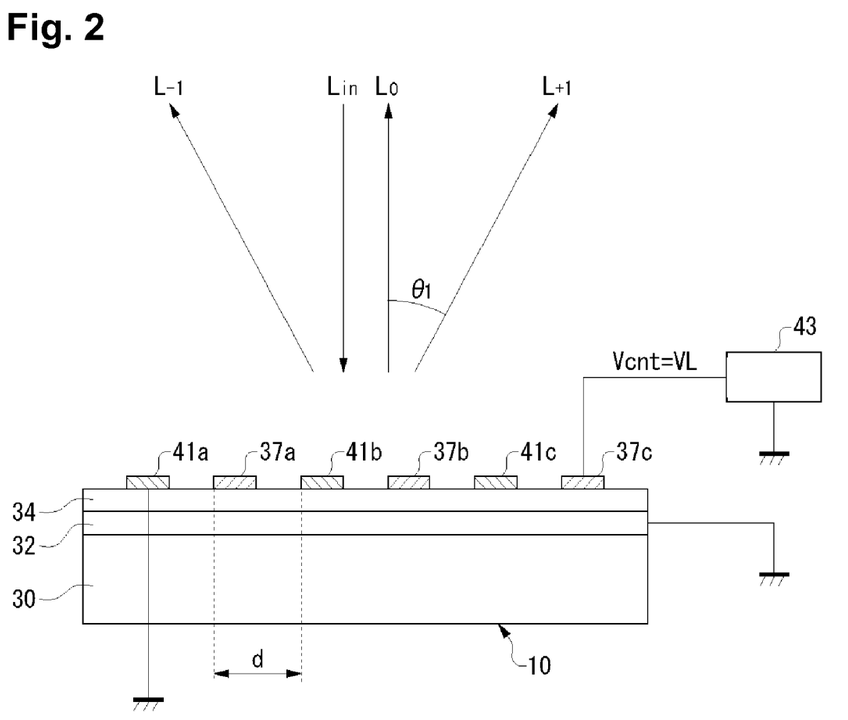
FIG. 2 is a view showing the light control device in an "off" state.

The operation of the light control device 10 configured in the above-described manner will now be described referring to FIGS. 2 and 3. FIG. 2 is a view showing the light control device 10 in an "off" state. In FIGS. 1 and 2, like parts are designated by like reference numerals.

When the light control device 10 is in an "off" state, control voltage Vcnt applied to the electrode segments 37a, 37b, and 37c is controlled so that all the electrode segments 41a, 37a, 41b, 37b, 41c, and 37c, formed on the light modulating film 34 have insignificant electric fields that are determined by a potential difference relative to the planar electrode 32. An insignificant electric field refers to an electric field of a certain degree that causes no change in the reflective index of the light modulating film 34, or that causes too small a change in the reflective index to allow the light modulating film 34 to function as a diffraction grating.

In the light control device 10 according to the present preferred embodiment, when the device 10 is in an "off" state, control voltage Vcnt applied to the electrode segments 37a, 37b, and 37c is the low level VL. Then, the electrode segments 37a, 37b, and 37c and the planar electrode 32 have the same potentials, and therefore, there are no electric fields generated between the electrodes segments 37a, 37b, and 37c and the planar electrode 32. Also, as described above, the potentials of the electrode segments 41a, 41b, and 41c are fixed to the ground potential, that is, the potentials are the same as that of the planar electrode 32, generating no electric fields between the electrode segments 41a, 41b, and 41c and the planar electrode 32. Therefore, there are no electric fields generated with respect to any of the electrode segments 37a, 37b, 37c, 41a, 41b, and 41c formed on the light modulating film 34.

The distribution of the refractive indices on the upper surface of the light modulating film 34 is periodic and can be represented by $n_{air}, n_{el}, n_{air}, n_{el}, n_{air}, \ldots$, where $n_{air}$ refers to the refractive index of air and $n_{el}$ refers to the refractive index of each of the electrode segments. That is, the plurality of electrode segments 41a, 37a, 41b, 37b, 41c, and 37c arranged at the first predetermined interval define a diffraction grating.

The grating interval of this diffraction grating is equal to the interval d, which is the distance between the electrode segments 41a, 37a, 41b, 37b, 41c, and 37c.

With the light control device 10 in this state, when laser light $L_{in}$ with a wavelength $\lambda$ is incident on the light control device 10 from a direction vertical thereto, light reflected by the planar electrode 32 is diffracted to become diffracted light including ±1st order light $L_{\pm 1}$, as well as 0th order light $L_0$ reflected in a vertical direction. It is noted that in FIG. 2 diffracted light with orders higher than 2 and lower than −2 are not shown. The diffraction angle $\theta_1$ of the ±1st order light $L_{\pm 1}$ is represented by:

$$\theta_1 = \arcsin(\lambda/d) \quad (1)$$

where d refers to the interval of the electrode segments and $\lambda$ refers to the wavelength of the laser light $L_{in}$. For example, when $\lambda$=650 nm and the interval d=2 µm, then the diffraction angle $\theta_1$ is approximately 18.9°.

Figure 3:
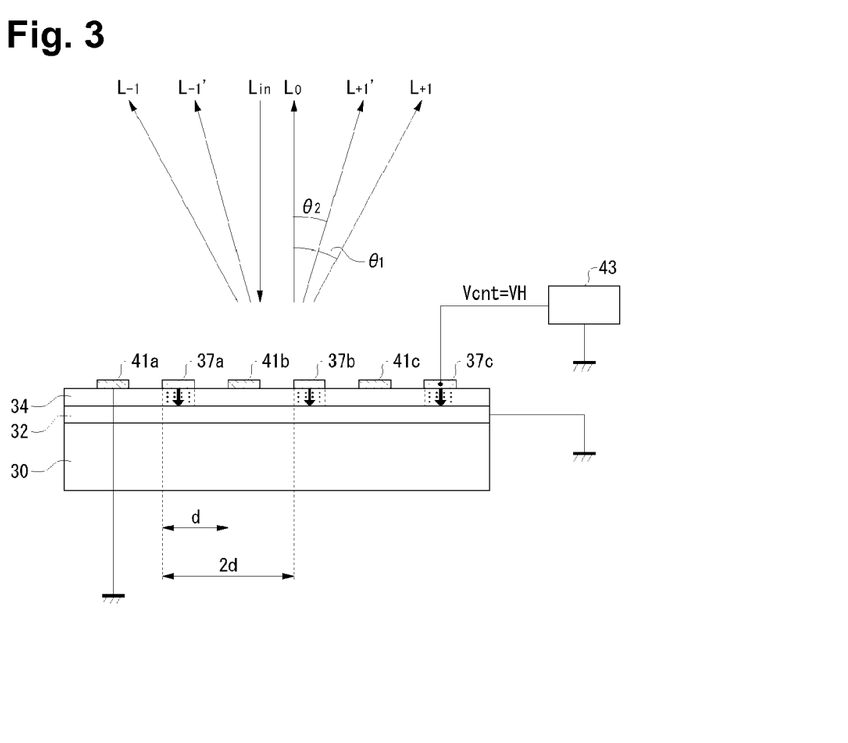
FIG. 3 is a view showing the light control device in an "on" state.

FIG. 3 is a view showing the light control device 10 in an "on" state. When the light control device 10 is in an "on" state, the controller 43 controls control voltage Vcnt applied to the electrode segments 37a, 37b, and 37c among the electrode segments 41a, 37a, 41b, 37b, 41c, and 37c formed on the light modulating film 34 so that there is an alternate arrangement of electrode segments having a significant electric field and electrode segments having an insignificant electric field, the significant electric field and the insignificant electric field being determined by a potential difference relative to the planar electrode 32.

A significant electric field refers to an electric field that allows the light modulating film 34 to effectively function as a diffraction grating when the significant electric field and an insignificant electric field are applied to the light modulating film 34 alternately, and thus there are refractive indices distributed at a predetermined interval in the light modulating film 34.

In the light control device 10 according to the present preferred embodiment, when the device 10 is in an "on" state, control voltage Vcnt applied to the electrode segments 37a, 37b, and 37c is the high level VH. The potentials of the electrode segments 41a, 41b, and 41c are fixed to the ground potential. Therefore, the control voltage Vcnt that is the high level VH is applied alternately to the electrode segments 41a, 37a, 41b, 37b, 41c, and 37c.

There are potential differences between the electrode segments 37a, 37b, and 37c, to which control voltage Vcnt of high level VH is applied, and the planar electrode 32, which is fixed to a ground potential. This causes the application of electric fields E to the areas of the light modulating film 34 that are located between the electrode segments 37a, 37b, and 37c and the planar electrode 32. The electric field E is represented by:

$$E = V\text{cnt}/t \quad (2)$$

where t is the thickness of the light modulating film 34. The direction of the electric fields E is shown by the arrows in FIG. 3, that is, the direction from the electrode segments 37a, 37b, and 37c toward the planar electrode 32.

As described above, the refractive index n of the light modulating film 34 depends on the electric field E applied to the light modulating film 34. When PLZT is used for the light modulating film 34, the amount of change $\Delta n$ in the refractive index n of the light modulating film 34 and the applied electric field E have the relationship:

$$\Delta n = \tfrac{1}{2} \times (n)^3 \times R \times E^2 \quad (3)$$

As seen from the equation (3), the refractive index of the light modulating film 34 changes in proportion to the square of an electric field applied to the light modulating film 34. In the equation, R refers to an electro-optic constant (Kerr constant).

Thus, in the electric field E applied areas of the light modulating film 34 that are located between the electrode segments 37a, 37b, and 37c and the planar electrode 32, the refractive index becomes n+$\Delta$n. Since the potentials of the electrode segments 41a, 41b, and 41c are fixed to the ground potential, there are no electric fields generated between these electrode segments and the planar electrode 32, which is also fixed to the ground potential. Thus, in the areas of the light modulating film 34 that are located between the electrode segments 41a, 41b, and 41c and the planar electrode 32, the refractive index remains n. Therefore, the distribution of the refractive indices in the light modulating film 34 is n, n+$\Delta$n, n, n+$\Delta$n, ..., that is, the refractive indices show a periodic change. This makes the light modulating film 34 having a periodic distribution of refractive indices function as a diffraction grating. The grating interval of this diffraction grating is twice the interval d, which is the interval between the electrode segments 41a, 37a, 41b, 37b, 41c, and 37c, as shown in FIG. 3.

The ±1st order light of the diffraction grating generated by the refractive indices distributed at the second predetermined interval in the light modulating film 34 will be hereinafter referred to as ±1'st order light $L_{\pm 1'}$, for the purpose of distinction from the ±1st order light $L_{\pm 1}$ of the diffraction grating generated by the plurality of electrode segments 41a, 37a, 41b, 37b, 41c, and 37c arranged at the first predetermined interval. The diffraction angle $\theta_2$ of the ±1'st order light $L_{\pm 1'}$ is represented by:

$$\theta_2 = \arcsin(\lambda/2d) \quad (4)$$

As seen from the equation (4), the diffraction angle $\theta_2$ of the ±1'st order light $L_{\pm 1'}$ is different from the diffraction angle $\theta_1$ of the ±1st order light $L_{\pm 1}$, which is determined by the equation (1). For example, when $\lambda$=650 nm and the interval d=2 µm, then the diffraction angle $\theta_2$ is approximately 9.3°.

Thus, when the light control device 10 is in an "off" state, only the diffraction grating generated by the plurality of electrode segments 41a, 37a, 41b, 37b, 41c, and 37c arranged at the first predetermined interval is in action, causing diffracted light including 0th order light $L_0$ and ±1st order light $L_{\pm 1}$. When the light control device 10 is in an "on" state, the diffraction grating generated by the refractive indices distributed at the second predetermined interval in the light modulating film 34 is also in action, in addition to the above diffraction grating.

If the control voltage Vcnt is applied to all of the electrode segments 41a, 37a, 41b, 37b, 41c, and 37c arranged at the first predetermined interval, the interval of distribution of the refractive indices in the light modulating film 34 becomes equal to the interval d of the electrode segments 41a, 37a, 41b, 37b, 41c, and 37c. In this case, the grating interval of the diffraction grating generated by the electrode segments arranged at the first predetermined interval becomes equal to the grating interval of the diffraction grating generated by the refractive indices distributed at the first predetermined interval. Thus, the diffraction angles of the diffraction gratings are equal, making it impossible to extract any light.

In the light control device 10 according to the present preferred embodiment, the application of control voltage Vcnt only to the electrode segments 37a, 37b, and 37c among the electrode segments 41a, 37a, 41b, 37b, 41c, and 37c makes it possible to set the grating interval of the diffraction grating generated by the refractive indices distributed at the second predetermined interval in the light modulating film 34 to be larger than the grating interval of the diffraction grating generated by the electrode segments arranged at the first predetermined interval. This in turn makes it possible to emit the ±1'st order light $L_{\pm 1}$ caused by the diffraction grating of the refractive indices distributed at the second predetermined interval in the light modulating film, in the direction $\theta_2$ different from the direction $\theta_1$ of the ±1st order light $L_{\pm 1}$ caused by the diffraction grating of the electrode segments arranged at the first predetermined interval.

Being able to extract the ±1'st order light $L_{\pm 1}$ makes the device a light control device that carries out on-off control of light. When the light control device 10 is in an "off" state, light is not diffracted in the direction of the diffraction angle $\theta_2$. Therefore, there is approximately no leakage of light when the light control device 10 is in an "off" state, thereby improving the on-off ratio of the light control device 10.

While in the light control device 10 according to the present preferred embodiment, six electrode segments 41a, 37a, 41b, 37b, 41c, and 37c are preferably arranged at the first predetermined interval, the number of the electrode segments is not limited to six, and less or more electrode segments may be provided. In this case, the ±1'st order light $L_{=1'}$ can be obtained more effectively.

Also in the present preferred embodiment, control voltage Vcnt is applied in an alternate manner to the electrode segments 41a, 37a, 41b, 37b, 41c, and 37c, thereby setting the interval of distribution of the refractive indices in the light modulating film 34 to be twice the interval d of the electrode segments. The interval of distribution of the refractive indices in the light modulating film 34 may not necessarily be twice the interval d of the electrode segments insofar as the interval of distribution of the refractive indices is larger than the interval d of the electrode segments.

The extraction of the ±1'st order light $L_{\pm 1'}$ may be achieved by a lens or a light receiving element with its angle of location being adjusted for receiving only the ±1'st order light $L_{\pm 1'}$ or the −1'st order light $L_{−1'}$, or by a filter that transmits only the ±1'st order light $L_{\pm 1'}$. For example, the filter may be a schlieren filter.

While in the light control device 10 according to the present preferred embodiment, the plurality of electrode segments provided on the light modulating film 34 are preferably arranged as if they were the teeth of the comb-shaped electrodes, the electrodes do not necessarily have to be arranged in the form of combs. For example, a plurality of plate electrode segments may be provided on the light modulating film 34, in which case, a voltage is applied to each of the electrode segments using wirings provided inside the substrate 30.

While in FIGS. 2 and 3, light is incident on the light control device 10 from a direction vertical thereto, light may be incident with an angle of inclination with respect to the vertical direction.

While in FIGS. 2 and 3 the planar electrode 32 has an additional function as a reflecting layer, thereby providing a reflective light control device, the planar electrode 32 may be a transparent electrode and the substrate 30 may be a transparent substrate such as sapphire, thereby providing a transmissive light control device.

Figure 4:
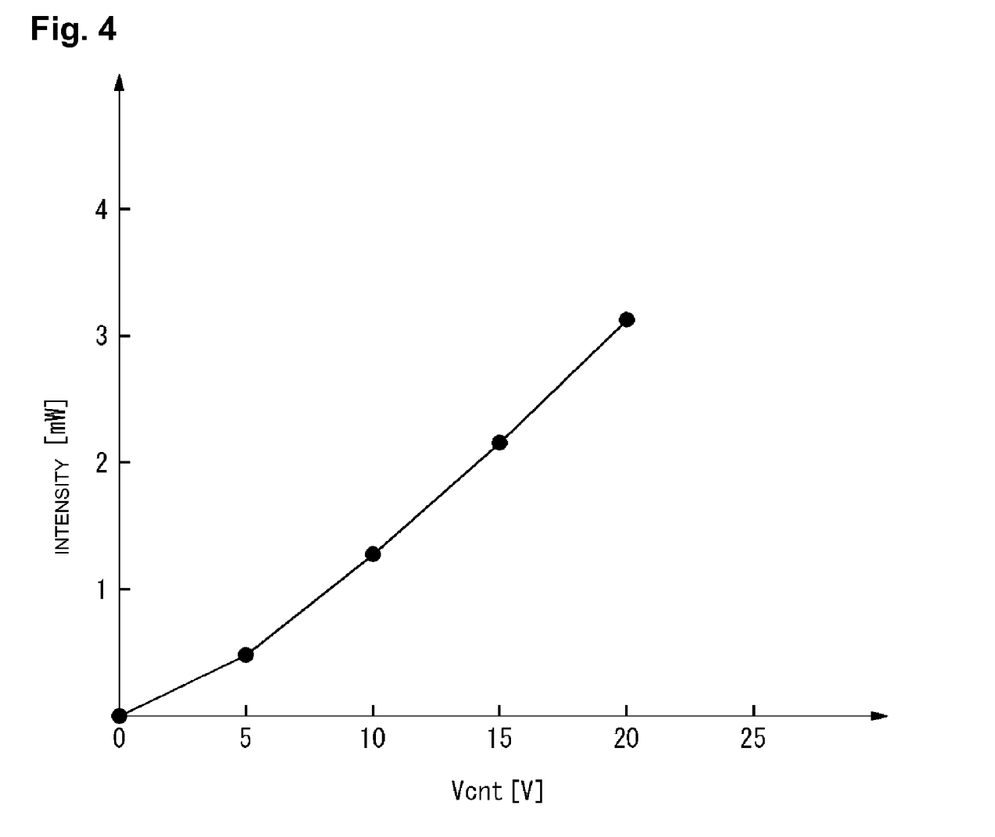
FIG. 4 is a graph showing the relationship between control voltage Vcnt and the intensity of ±1'st order light.

FIG. 4 is a graph showing the relationship between control voltage Vcnt and the intensity of the ±1'st order light. In FIG. 4, the horizontal axis corresponds to the voltage value [V] of control voltage Vcnt applied to the comb-shaped electrode 36 by the controller 43, and the vertical axis corresponds to the intensity [mW] of the ±1'st order light. In the light control device 10 according to the present preferred embodiment, when Vcnt=0 V, the light intensity is 0.01 mW, and when Vcnt=20 V, the light intensity is 2.97 mW. Thus, the on-off ratio is approximately 300, that is, a high on-off ratio is achieved.

Figure 5:
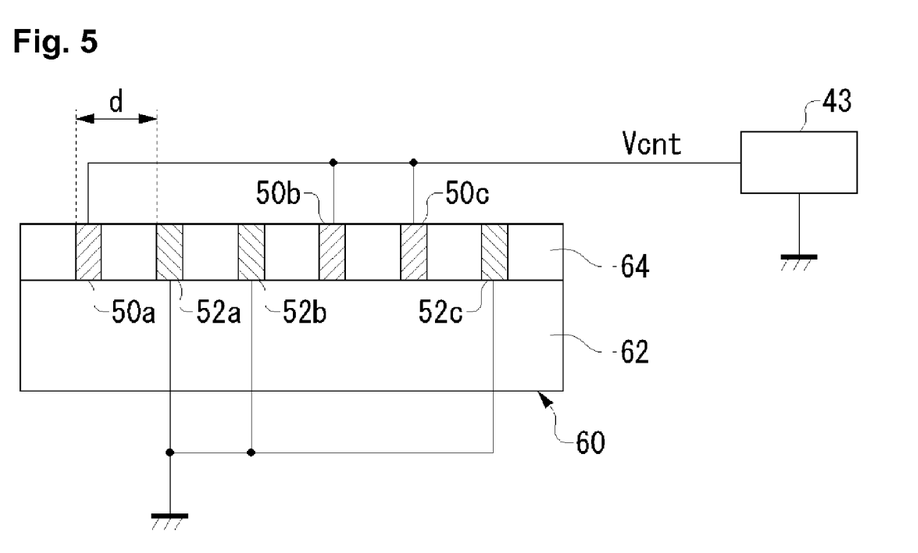
FIG. 5 is a cross sectional view of a modified example of the light control device.

FIG. 5 is a cross sectional view of a modified example of the light control device. While the light control device 10 described in FIG. 1 functions as a reflective light control device, a light control device 60 described in FIG. 5 functions as a transmissive light control device. Referring to FIG. 5, the light control device 60 has a substrate 62, a light modulating film 64, and electrode segments 50a, 52a, 52b, 50b, 50c, and 52c.

The substrate 62 is an insulating transparent substrate, examples including a glass substrate and a sapphire substrate. On the substrate 62, the light modulating film 64 is formed. The light modulating film 64 is a solid electro-optic material, which has a changeable refractive index in accordance with an electric field applied to the light modulating film 64. Examples of such an electro-optic material include PLZT and PZT. The light modulating film 64 is then subjected to photolithography including etching away the portions of the light modulating film 64 in which the electrode segments are to be formed while masking the other portions of the light modulating film 64. The etched portions are then filled with gold (Au) by sputtering, thereby forming the electrode segments 50a, 52a, 52b, 50b, 50c, and 52c. These electrode segments are arranged at a first predetermined interval d. In the light control device 60, the potentials of the electrode segments 50a, 50b, and 50c are controlled by control voltage Vcnt applied from the controller 43. The potentials of the electrode segments 52a, 52b, and 52c are fixed to a ground potential.

Figure 6:
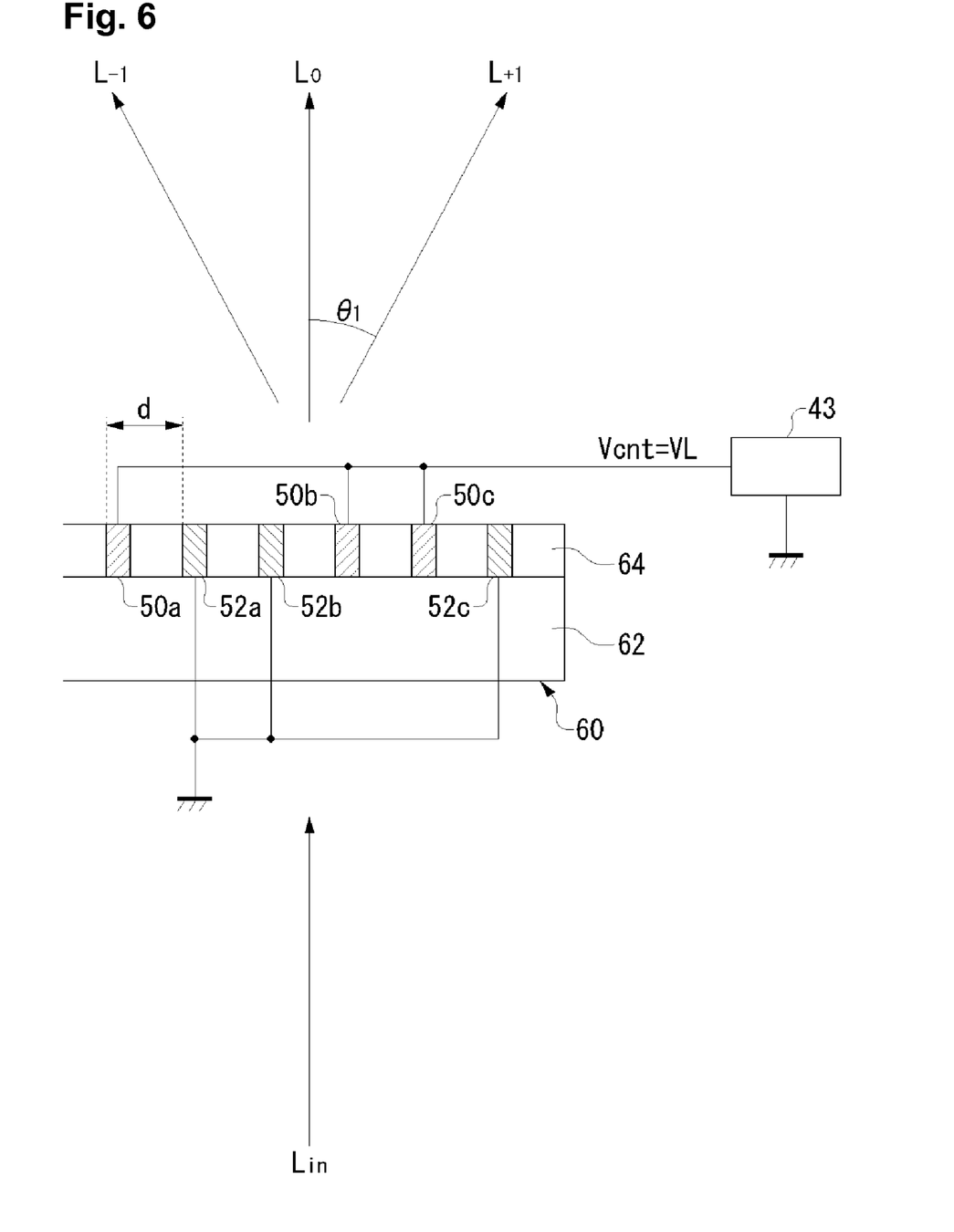
FIG. 6 is a view showing the modified example of the light control device in an "off" state.

FIG. 6 is a view showing the modified example of the light control device in an "off" state. When the light control device 60 is in an "off" state, control voltage Vcnt applied to the electrode segments 50a, 50b, and 50c is the low level VL.

In this state, assume that laser light $L_{in}$ with wavelength λ is incident on the light control device 60 from the side of the substrate 62. In the light control device 60, the electrode segments 50a, 52a, 52b, 50b, 50c, and 52c are arranged at a first predetermined interval in the light modulating film 64, and thus, they define a diffraction grating of a transmissive type, causing diffracted light including ±1st order light $L_{\pm 1}$ as well as 0th order light $L_0$, which is transmitted in the direction of the optical axis of the laser light $L_{in}$. The diffraction angle $\theta_1$ of the ±1st order light $L_{\pm 1}$ is represented by the above equation (1).

Figure 7:
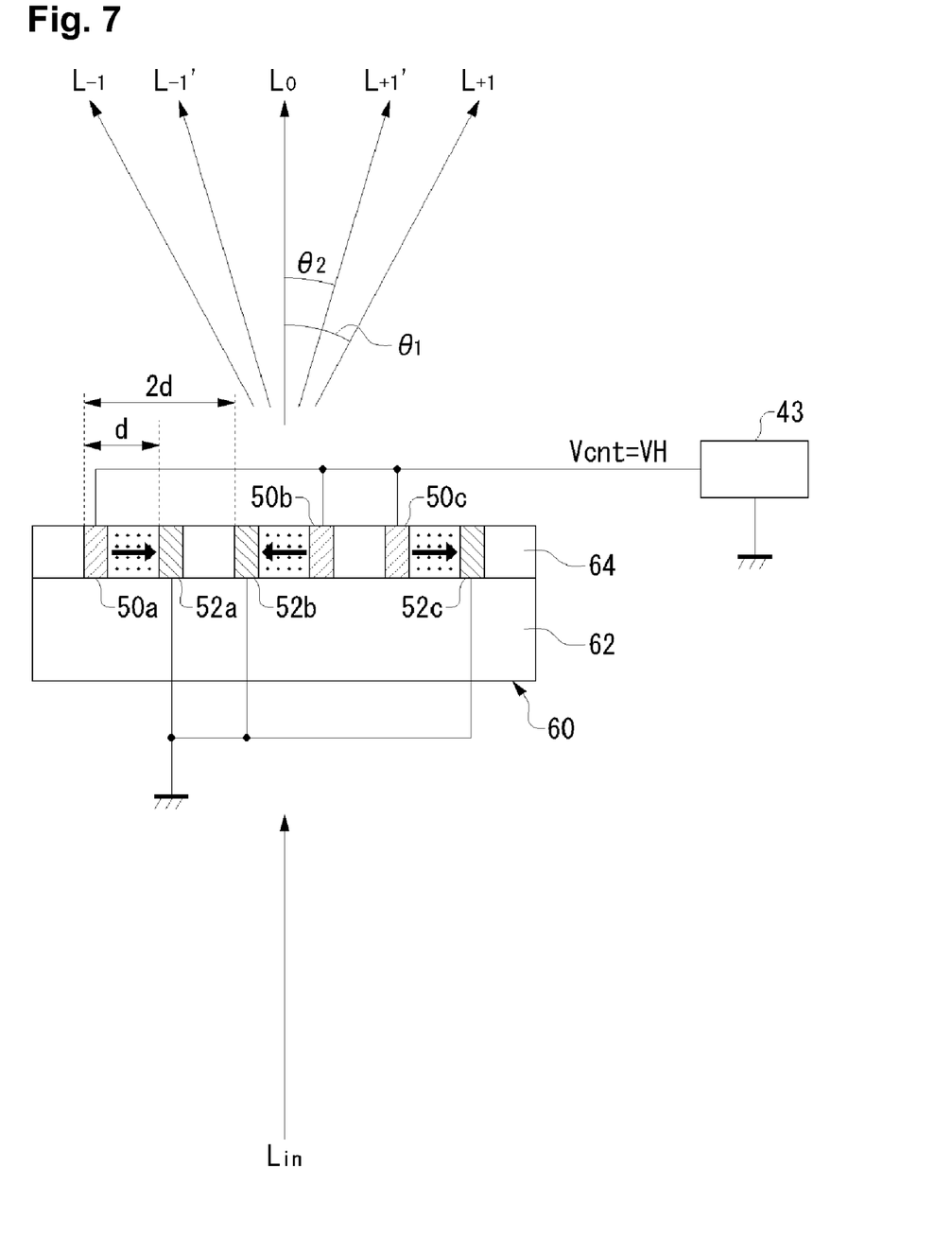
FIG. 7 is a view showing the modified example of the light control device in an "on" state.

FIG. 7 is a view showing the modified example of the light control device in an "on" state. When the light control device 60 is in an "on" state, control voltage Vcnt applied to the electrode segments 50a, 50b, and 50c is the high level VH. In this case, there are electric fields generated between the electrode segments 50a and 52a, between the electrode segments 52b and 50b, and between the electrode segments 50c and 52c. Because of these electric fields, the refractive index of the light modulating film 64 changes from n to n+Δn in the areas between the electrode segments 50a and 52a, between the electrode segments 52b and 50b, and between the electrode segments 50c and 52c. Since the potentials of the electrode segments 52a and 52b are the ground potential and thus the same, there are no electric fields generated between these electrode segments, where the refractive index of the light modulating film 64 remains n. Also, since the electrode segments 50b and 50c are both provided with the high level VH and thus have the same potentials, there are no electric fields generated between these electrode segments, where the refractive index of the light modulating film 64 remains n.

With the light control device 60 in an "on" state, the light modulating film 64 has areas where the refractive index is n and areas where the refractive index is n+Δn generated alternately. The interval of change in the refractive index is twice the interval d of the electrode segments, as shown in FIG. 7. As in the light control device 10 described referring to FIGS. 1-3, the ±1'st order light $L_{\pm 1'}$ is generated in the direction of the diffraction angle $\theta_2$ determined by the equation (4). Being able to extract the ±1'st order light $L_{\pm 1'}$ makes the device a light control device.

Figure 8:
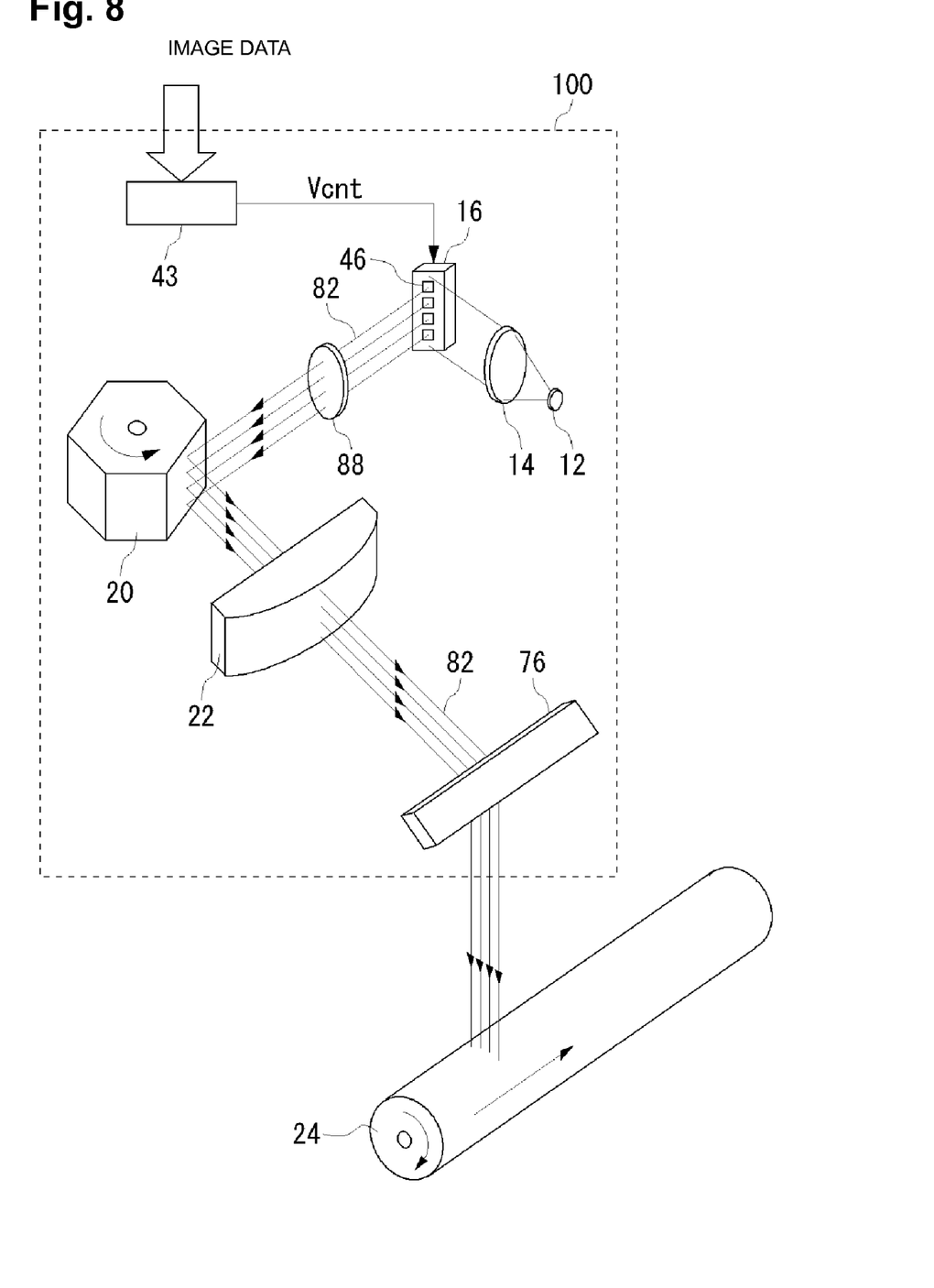
FIG. 8 is a view showing a laser scanning system using the light control device according to a preferred embodiment of the present invention.

The light control device according to the present preferred embodiment can be used to provide various light control systems. One example of such a light control system is shown in FIG. 8. FIG. 8 is a view showing a laser scanning system using the light control device according to a preferred embodiment of the present invention. A laser scanning system 100 is used for, for example, an image forming device such as a laser printer.

Referring to FIG. 8, the laser scanning system 100 preferably includes a semiconductor laser 12, a lens 14, a light control device 16, a collimator lens 88, a polygon mirror 20, an f·θ lens 22, and a plane mirror 76. The semiconductor laser 12 and the lens 14 define a light emitter for radiating light to the light control device 16. The collimator lens 88, the polygon mirror 20, the f·θ lens 22, and the plane mirror 76 define a light receiver for receiving light emitted from the light control device 16.

The semiconductor laser 12 emits continuously oscillating laser beams. Continuously oscillating means that the laser beam is not modulated immediately after emitting from the semiconductor laser 12. The intensity of the laser beam emitted from the semiconductor laser 12 is kept constant while being monitored by a photo diode (not shown) provided in the semiconductor laser 12 and subjected to APC control.

The lens 14 functions to turn the continuously oscillating laser beam emitted from the semiconductor laser 12 into parallel light and make it incident on the light control device 16. Even when the laser beam emitted from the semiconductor laser 12 is diffused light, the use of the lens 14 makes it possible to make such light incident on the light control device 16 as light flux. The lens 14 may be a beam expander. In this case, even when the diameter of the laser beam emitted from the semiconductor laser 12 is small, the diameter can be enlarged before the light is made incident on the light control device 16.

In the light control device 16, the light control device 10 described referring to FIGS. 1-3 is used as a pixel 46, and four such pixels 46 are arranged in a one-dimensional array. However, any suitable number of pixels may be used. The controller 43 provides control voltage Vcnt to the four pixels 46 of the light control device independently to carry out the on-off control of the ±1'st order light with respect to each pixel 46, thereby emitting four laser beams 82. While 0th order light and ±1st order light (not shown) are generated by the light control device 16 as well as the ±1'st order light, only the +1'st order light or the −1'st order light is extracted by providing the collimator lens 88 in the diffraction direction of the +1'st order light or the −1'st order light. Between the light control device 16 and the collimator lens 88, a filter that transmits only the ±1'st order diffracted light may be provided. For example, the filter may be a schlieren filter.

The four laser beams 82 emitted from the light control device 16 are adjusted to be parallel light by the collimator lens 88, and then made incident on the polygon mirror 20. The polygon mirror 20 has a plurality of reflecting mirrors and functions as a polarizer that polarizes the laser beams 82 to scan on the photosensitive surface of a photoreceptor drum 24.

The laser beams 82 that are reflected and polarized by the polygon mirror 20 are passed through f·θ lens 22 that corrects distortion aberrations of the beams and through the plane mirror 76 and imaged on the photoreceptor drum 24. The polygon mirror 20 rotates to allow the laser beams 82 to scan on the photosensitive surface of the photoreceptor drum 24. Upon completion of a first scanning of the photoreceptor drum 24 in the main scanning direction, the photoreceptor drum 24 rotates by a specified amount and scanning in the main scanning direction is carried out again. By repeating this operation, a two-dimensional electrostatic image is formed on the photoreceptor drum 24. While in FIG. 8, the laser beams are radiated to the photoreceptor drum 24 by the laser scanning system 100, the image display device may be such that the laser beams are projected onto a screen.

While the present invention has been described with respect to preferred embodiments thereof, it will be apparent to those skilled in the art that the disclosed invention may be modified in numerous ways and may assume many preferred embodiments other than those specifically set out and described above. Accordingly, it is intended by the appended claims to cover all modifications of the present invention that fall within the true spirit and scope of the present invention.

What is claimed is:

1. A light control device comprising:
    a light modulating film having a refractive index that changes in accordance with an electric field applied to the film;
    a plurality of electrode segments arranged at a first predetermined interval on the light modulating film; and
    a controller arranged to apply a voltage to at least predetermined electrode segments of the plurality of electrode segments, whereby electric fields are distributed at a second predetermined interval in the light modulating film; wherein
    the second predetermined interval of the electric fields generated in the light modulating film is larger than the first predetermined interval of the plurality of electrode segments.

2. The light control device according to claim 1, wherein the light modulating film is made of an electro-optic material having a refractive index that changes in proportion to the square of an electric field applied to the light modulating film.

3. The light control device according to claim 2, wherein the electro-optic material is lead zirconate titanate or lanthanum lead zirconate titanate.

4. The light control device according to claim 1, wherein the light control device is arranged on a semiconductor substrate.

5. The light control device according to claim 1, further comprising a light receiver arranged to detect light from the light modulating film when the light control device is in an "on" state.

6. A light control system comprising:
    the light control device recited in claim 5; and
    a light emitter arranged to radiate light to the light control device.

7. A light control device comprising:
    a light modulating film having a refractive index that changes in accordance with an electric field applied to the film;
    a plurality of first electrode segments arranged at a first predetermined interval on a first surface of the light modulating film;

a second electrode arranged on a second surface of the light modulating film opposite the first surface of the light modulating film; and a controller arranged to control a voltage applied to at least predetermined electrode segments of the plurality of first electrode segments; wherein when the light control device is in an "on" state, the controller is arranged to control the voltage applied to the at least predetermined electrode segments of the plurality of first electrode segments so that there is an alternate arrangement of an electrode segment having a significant electric field and an electrode segment having an insignificant electric field, the significant electric field and the insignificant electric field being determined by a potential difference relative to the second electrode; and when the light control device is in an "off" state, the controller is arranged to control the voltage applied to the at least predetermined electrode segments of the plurality of first electrode segments so that all of the plurality of first electrode segments have insignificant electric fields determined by a potential difference relative to the second electrode.

8. The light control device according to claim 7, wherein when the light control device is in an "off" state, the controller is arranged to control the voltage applied to the at least predetermined electrode segments of the plurality of first electrode segments so that none of the plurality of first electrode segments have a potential difference relative to the second electrode.

9. The light control device according to claim 7, further comprising a light reflecting layer located on a side of the second surface of the light modulating film.

10. The light control device according to claim 9, wherein the second electrode acts as the light reflecting layer.

11. The light control device according to claim 7, wherein the light modulating film is made of an electro-optic material having a refractive index that changes in proportion to the square of an electric field applied to the light modulating film.

12. The light control device according to claim 11, wherein the electro-optic material is lead zirconate titanate or lanthanum lead zirconate titanate.

13. The light control device according to claim 7, wherein the light control device is arranged on a semiconductor substrate.

14. The light control device according to claim 7, further comprising a light receiver arranged to detect light from the light modulating film when the light control device is in the "on" state.

15. A light control system comprising:
the light control device recited in claim 14; and
a light emitter arranged to radiate light to the light control device.

* * * * *